United States Patent
Boos

(10) Patent No.: US 12,286,150 B2
(45) Date of Patent: Apr. 29, 2025

(54) SYSTEM AND METHOD FOR GUIDING A VEHICLE, AND VEHICLE COMPRISING SAID SYSTEM

(71) Applicant: Robert Bosch GmbH, Stuttgart (DE)

(72) Inventor: Nicolas Boos, Mutlangen (DE)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 18/301,479

(22) Filed: Apr. 17, 2023

(65) Prior Publication Data
US 2023/0356778 A1    Nov. 9, 2023

(30) Foreign Application Priority Data

May 9, 2022 (DE) ............. 10 2022 204 506.8

(51) Int. Cl.
| | |
|---|---|
| *B62D 1/22* | (2006.01) |
| *B62D 1/12* | (2006.01) |
| *B62D 5/04* | (2006.01) |
| *B62D 6/00* | (2006.01) |
| *B62D 15/02* | (2006.01) |

(52) U.S. Cl.
CPC ............. *B62D 1/22* (2013.01); *B62D 1/12* (2013.01); *B62D 5/046* (2013.01); *B62D 6/002* (2013.01); *B62D 15/0205* (2013.01)

(58) Field of Classification Search
None
See application file for complete search history.

(56) References Cited

U.S. PATENT DOCUMENTS

| | | | | |
|---|---|---|---|---|
| 2022/0253053 A1* | 8/2022 | Niwa | .................. | B60W 60/007 |
| 2023/0311975 A1* | 10/2023 | Strecker | ................ | B62D 5/006 |
| | | | | 701/41 |
| 2023/0365187 A1* | 11/2023 | Hasegawa | .............. | B62D 5/049 |
| 2023/0365188 A1* | 11/2023 | Ribigini | ................ | B62D 6/007 |
| 2024/0218634 A1* | 7/2024 | Sonoda | ................ | E02F 9/2004 |

FOREIGN PATENT DOCUMENTS

| | | | | | |
|---|---|---|---|---|---|
| CN | 110654450 B | * | 10/2021 | ............. | B62D 5/046 |
| CN | 114911218 A | * | 8/2022 | ............ | B60W 10/20 |
| CN | 117022427 A | * | 11/2023 | ........... | B62D 15/021 |
| EP | 3587218 B1 | * | 2/2022 | ................ | B62D 1/22 |
| EP | 4275994 A1 | * | 11/2023 | ........... | B62D 15/021 |
| EP | 4276571 A1 | * | 11/2023 | ............ | B60W 10/04 |
| EP | 4276571 B1 | * | 10/2024 | ............ | B60W 10/04 |
| JP | 2022121997 A | * | 8/2022 | ............ | B60W 10/20 |

* cited by examiner

Primary Examiner — Kevin R Steckbauer
(74) Attorney, Agent, or Firm — Maginot, Moore & Beck LLP

(57) ABSTRACT

A system for guiding a vehicle includes first and second operating elements, which are configured to influence a wheel steering angle of the vehicle and are not mechanically coupled to one another. A target steering angle is determined as a function of a sum of steering torques, which is dependent on a target steering torque and actual steering torques of the first and of the second operating elements. The first and second actual steering angles are adjusted as a function of the target steering angles in the respective first and second operating elements. A target wheel steering angle is determined as a function of the target steering angle, wherein the sum of steering angles includes two summands dependent on the first actual steering angle and the second actual steering angle, respectively. The wheel steering angle is adjusted as a function of the target wheel steering angle.

17 Claims, 5 Drawing Sheets

SYSTEM AND METHOD FOR GUIDING A VEHICLE, AND VEHICLE COMPRISING SAID SYSTEM

This application claims priority under 35 U.S.C. § 119 to application no. DE 10 2022 204 506.8, filed on May 9, 2022 in Germany, the disclosure of which is incorporated herein by reference in its entirety.

BACKGROUND

The disclosure proceeds from a system and a method for guiding a vehicle and from a vehicle comprising said system.

Systems for guiding vehicles comprising a plurality of operating elements for guiding must be configured such that a synchronization of the operating elements occurs reliably and with as little influence as possible on an operating feeling.

SUMMARY

A method for guiding a vehicle having a system comprising a first operating element and a second operating element for influencing a wheel steering angle of the vehicle, wherein the first operating element and the second operating element are not mechanically coupled to one another, provides that a target steering angle is determined as a function of a sum of steering torques, wherein the sum of steering torques comprises a first summand, which is dependent on a target steering torque, wherein the sum of steering torques comprises a second summand, which is dependent on an actual steering torque of the first operating element, and wherein the sum of steering torques comprises a third summand, which is dependent on an actual steering torque of the second operating element, wherein, as a function of the target steering angle in the first operating element, a first actual steering angle is adjusted, and, in the second operating element, a second actual steering angle is adjusted, and wherein a target wheel steering angle is determined as a function of the target steering angle or as a function of an in particular weighted sum of steering angles, wherein the sum of steering angles comprises a first summand, which is dependent on the first actual steering angle, and wherein the sum of steering angles comprises a second summand, which is dependent on the second actual steering angle, and wherein the wheel steering angle is adjusted as a function of the target wheel steering angle.

The target wheel steering angle is preferably determined as a function of the weighted sum of steering angles, wherein a first weighting of the first actual steering angle in the sum of steering angles is determined as a function of the actual steering torque of the first operating element, and/or wherein a second weighting of the second actual steering angle in the sum of steering angles is determined as a function of the actual steering torque of the second operating element.

The first weighting is preferably determined as a function of a relation of an amount of the actual steering torque of the first operating element to a first reference sum, which comprises a first summand, which is dependent on the amount of the actual steering torque of the first operating element, and wherein the first reference sum comprises a second summand, which is dependent on the amount of actual steering torque of the second operating element, and/or that the second weighting is determined as a function of a relation of an amount of the actual steering torque of the second operating element to a second reference sum, which comprises a first summand, which is dependent on an amount of the actual steering torque of the first operating element, and wherein the second reference sum comprises a second summand, which is dependent on the amount of actual steering torque of the second operating element. As a result, with an increasing proportion of an operating element in the respective sum of the steering torques, the proportion of the calculated target wheel steering angle increases.

The sum of steering angles can comprise a third summand comprising the in particular weighted target steering angle.

Preferably, as a function of a difference of the first actual steering angle from the target steering angle, an adjustment deviation of an adjustment device is determined, which device is configured so as to adjust the first actual steering angle to the target steering angle, wherein, as a function of an adjustment variable, a target steering torque for the first operating element is determined, wherein the adjustment variable is determined as a function of an output variable of the adjustment device and as a function of a pre-activation, which is in particular weighted with a weight, for the first operating element, and wherein the first operating element is activated as a function of the target steering torque for the first operating element, and/or wherein an adjustment deviation of an adjustment device is determined as a function of a difference of the second actual steering angle from the target steering angle, which device is configured so as to adjust the second actual steering angle to the target steering angle, wherein a target steering torque for the second operating element is determined as a function of an adjustment variable, wherein the adjustment variable is determined as a function of an output variable of the adjustment device and as a function of a pre-activation, which is in particular weighted with a weight, for the second operating element, and wherein the second operating element is activated as a function of the target steering torque for the second operating element.

It is preferably provided that the actual steering torque of the first operating element is preferably measured or estimated, and/or that the actual steering torque of the second operating element is measured or estimated.

It is preferably provided that the sum of steering torques is dependent on a first weight at which the first summand of the sum of steering torques is weighted, dependent on a second weight at which the second summand of the sum of steering torques is weighted, and/or dependent on a third weight at which the third summand of steering torques is weighted.

It is preferably provided that, in an iteration of the method as a function of a transformation of the sum of steering torques, in particular a multiplication of the sum of steering torques by a factor or a mapping of the sum of steering torques with a characteristic curve or with a function, a target steering angle change is determined, wherein the target steering angle is determined as a function of a sum, which comprises a first summand, which is dependent on the target steering angle change, and a second summand, which is dependent on a target steering angle from an iteration preceding this iteration.

It is preferably provided that, as a function of a transformation of the sum of steering torques, in particular a multiplication of the sum of steering torques by a factor or a mapping of the sum of steering torques with a characteristic curve or with a function, a target steering angle change is determined, wherein the target steering angle change is filtered with a filter, and wherein the filtered target steering angle change is integrated into the target steering angle.

It is preferably provided that, in particular with a first computing device, the target steering torque is determined separately for the first operating element and the second operating element and/or that a respective compensation torque is calculated for compensating negative properties of the mechanics for the first operating element and the second operating element.

It is preferably provided that a weighted sum of steering torques is determined in particular with a second computing device, in which calculation the target steering torques and/or compensation torques determined separately for the first operating element and the second operating element are involved.

It is preferably provided that at least one weight in the weighted sum is specified, is applicable, or is determined dynamically as a function of a ratio of the actual steering torques.

A system for guiding a vehicle comprises a first operating element and a second operating element for influencing a wheel steering angle of the vehicle, wherein the first operating element and the second operating element are not mechanically coupled to one another, wherein the system comprises an adjustment device, which is configured so as to determine a target steering angle as a function of a sum of steering torques, wherein the sum of steering torques comprises a first summand, which is dependent on a target steering torque, wherein the sum of steering torques comprises a second summand, which is dependent on an actual steering torque of the first operating element, and wherein the sum of steering torques comprises a third summand, which is dependent on an actual steering torque of the second operating element, wherein the adjustment device is configured so as to adjust, as a function of the target steering angle in the first operating element, a first actual steering angle, and, in the second operating element, a second actual steering angle, and wherein the adjustment device is configured so as to determine a target wheel steering angle as a function of the target steering angle or as a function of an in particular weighted sum of steering angles, wherein the sum of steering angles comprises a first summand, which is dependent on the first actual steering angle, and wherein the sum of steering angles comprises a second summand, which is dependent on the second actual steering angle, and wherein the adjustment device is configured so as to adjust the wheel steering angle as a function of the target wheel steering angle. The system has advantages corresponding to the advantages of the method.

The adjustment device is preferably configured so as to carry out further steps in the method.

A vehicle comprising the system has advantages corresponding to the advantages of the system.

BRIEF DESCRIPTION OF THE DRAWINGS

Further advantageous embodiments can be found in the following description and the drawing.

The drawing shows.

DETAILED DESCRIPTION

Figure 1:
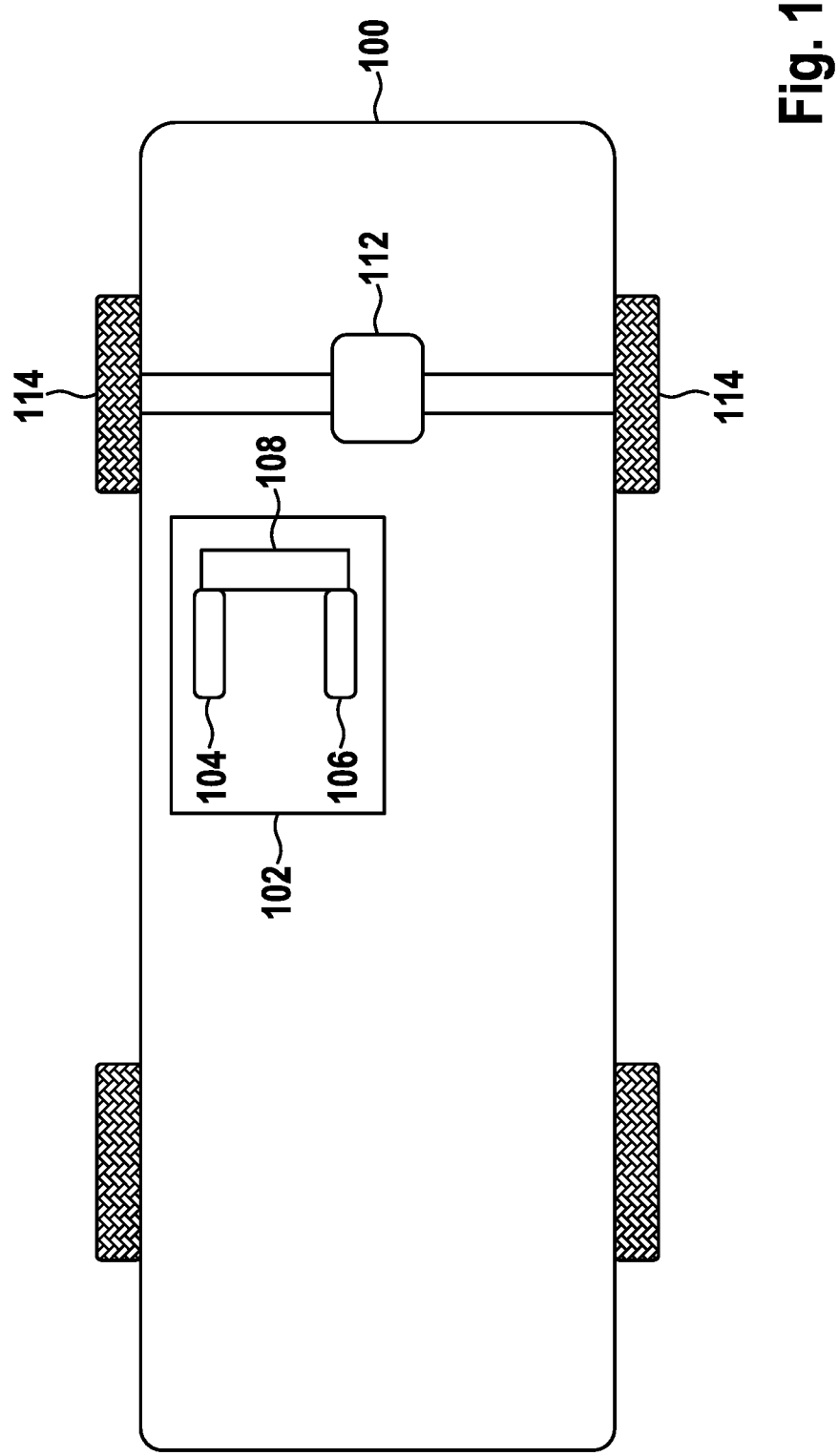
FIG. 1 a schematic illustration of a vehicle having a system for guiding the vehicle, FIG. 2 a schematic illustration of an adjustment device of the system for guiding the vehicle, FIG. 3 a first part of the adjustment device, FIG. 4 a second part of the adjustment device, FIG. 5 steps in a method for guiding the vehicle.

A vehicle 100 is schematically shown in FIG. 1.

The vehicle 100 comprises a system 102 for guiding the vehicle 100.

The system 102 comprises a first operating element 104 and a second operating element 106 and an adjustment device 108 for influencing a wheel steering angle of the vehicle 100. The system 102 comprises an actuator 112 for adjusting the wheel steering angle. The actuator is a steering, for example. For example, the steering is configured so as to influence the wheel steering angle of front wheels 114 of the vehicle 100.

The first operating element 104 is configured so as to activate the same actuator 112 as the second operating element 106.

For example, the first operating element 104 is a force-feedback joystick. For example, the second operating element 106 is a force-feedback joystick.

The first operating element 104 and the second operating element 106 are not mechanically coupled to one another.

The application is described for two operating elements. The following disclosure is not limited to two operating elements.

To activate the same actuator 112, the operating elements 104, 106 are on the one hand held synchronously by a synchronization. For example, the same steering angle is provided. On the other hand, it is in particular simultaneously ensured that the synchronization has no negative influence on an operating feeling, in the example the steering feeling, of the individual operating element 104, 106.

The adjustment device 108 is configured so as to activate the first operating element 104 and the second operating element 106. The adjustment device 108 is configured so as to activate the actuator 112.

Figure 2:
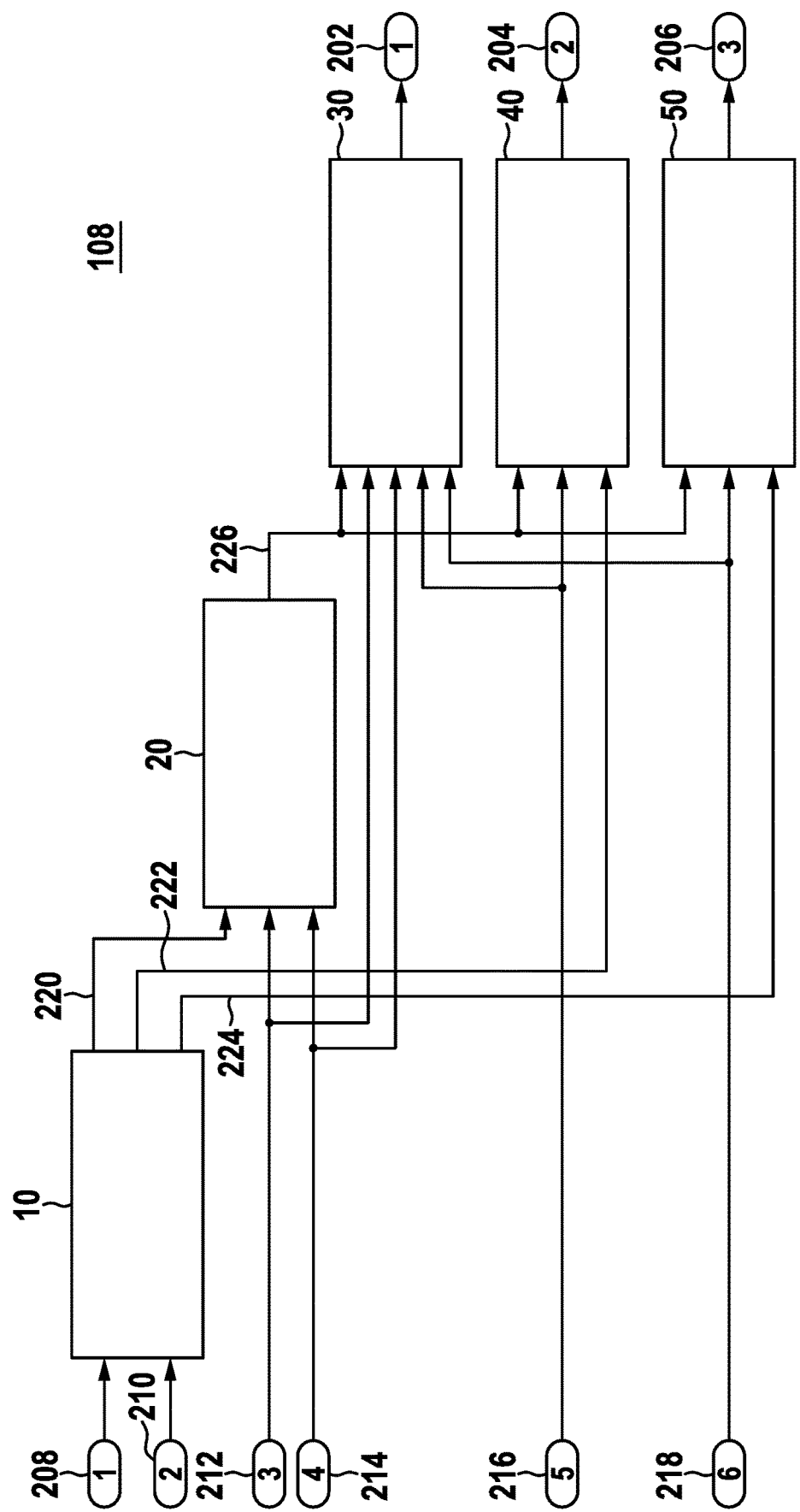

FIG. 2 shows a schematic illustration of the adjustment device 108.

The adjustment device 108 is configured so as to determine a target wheel steering angle 202, a target motor torque 204 for the first operating element 104, and a target motor torque 206 for the second operating element 106.

The adjustment device 108 is configured so as to determine the target wheel steering angle 202 as a function of, for example, driving state variables 208 and/or other input variables 210. The adjustment device 108 is configured so as to determine the target wheel steering angle 202 as a function of an actual steering torque 212 of the first operating element 104 and an actual steering torque 214 of the second operating element 106.

The adjustment device 108 is configured so as to determine the target steering torque 204 of the first operating element 104 as a function of a first actual steering angle 216 of the first operating element 104.

The adjustment device 108 is configured so as to determine the target steering torque 206 of the second operating element 104 as a function of a second actual steering angle 216 of the second operating element 106.

The adjustment device 108 comprises a first computing device 10, which is configured so as to determine a target steering torque 220 as a function of the driving state variables 208 and the further input variables 210. The computing device 10, in one example, is configured so as to determine the target steering torque 220 separately for the first operating element 104 and the second operating element 106.

The first computing device 10 is configured so as to determine a first pre-activation 222 for the target steering torque 204 for the first operating element 104, e.g., as a function of the driving state variables 208 and the further input variables 210.

The first computing device 10 is configured so as to determine a second pre-activation 224 for the second operating element 106, e.g., as a function of the driving state variables 208 and the further input variables 210.

The adjustment device 108 comprises a second computing device 20, which is configured so as to determine a target steering angle 226 as a function of the target steering torque 220, the first actual steering torque 212, and the second actual steering torque 214.

The adjustment device 108 comprises a third computing device 30, which is configured so as to determine the target wheel steering angle 202 as a function of the target steering angle 226, the actual steering torque 212 of the first operating element 104, the actual steering torque 212 of the second operating element 106, the first actual steering angle 216, and the second actual steering angle 218.

The adjustment device 108 comprises a fourth computing device 40, which is configured so as to determine the target steering torque 204 for the first operating element 104 as a function of the target steering angle 226, the first actual steering angle 216, and the first pre-activation 222.

The adjustment device 108 comprises a fifth computing device 50, which is configured so as to determine the target steering torque 206 for the second operating element 106 as a function of the target steering angle 226, the second actual steering angle 216, and the second pre-activation 224.

Figure 3:
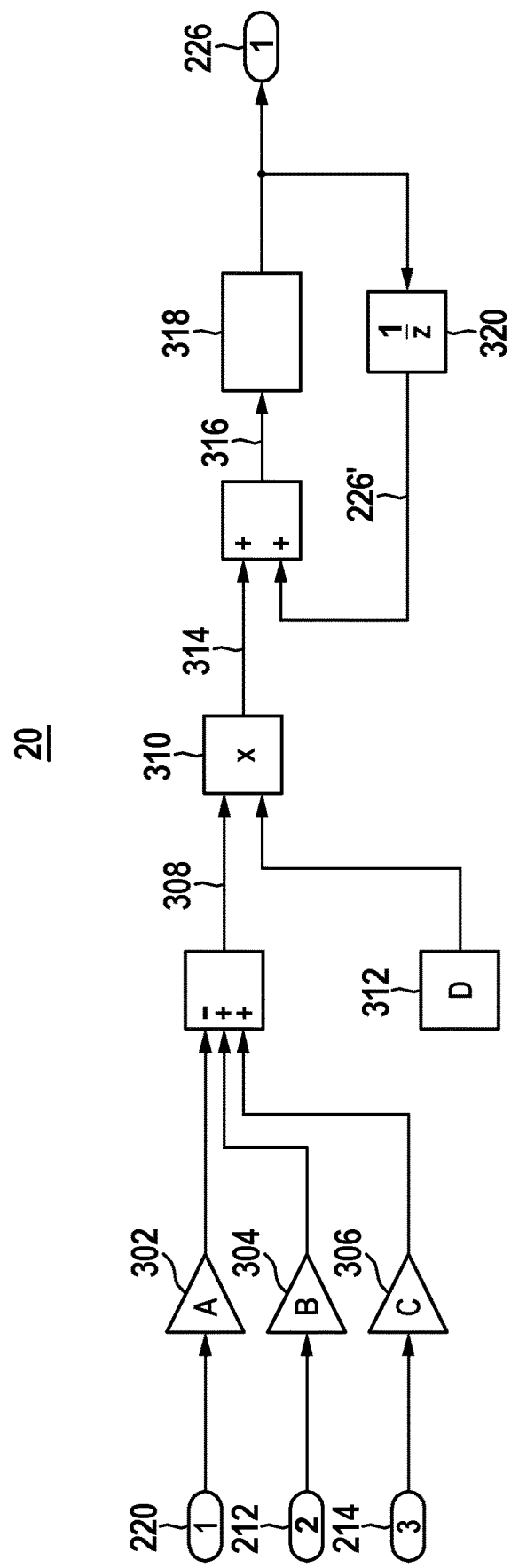

FIG. 3 shows an exemplary embodiment of the second computing device 20.

The second computing device 20 is configured so as to weight the target steering torque 220 with a first weight 302. The second computing device 20 is configured so as to weight the actual steering torque 212 of the first operating element 104 with a second weight 304. The second computing device 20 is configured so as to weight the actual steering torque 214 of the second operating element 106 with a third weight 306. The weights can be specified or applied.

The adjustment device 108 is configured so as to determine the target steering angle 226 as a function of a sum of steering torques 308. In the example, the second computing device 20 is configured so as to determine the sum of steering torques 308.

In the example, the target steering torque 220 weighted at the first weight 302 is subtracted from a sum of the actual steering torque 212, weighted at the second weight 304, of the first operating element 104 and the actual steering torque 214, weighted at the third weight, of the second operating element 106.

That is to say, the sum of steering torques 308 comprises a first summand that is dependent on the target steering torque 220. The sum of steering torques 308 comprises a second summand that is dependent on the actual steering torque 212 of the first operating element 104. The sum of steering torques 308 comprises a third summand that is dependent on the actual steering torque 214 of the second operating element 106.

In one example, the second computing device 20 is configured so as to determine a weighted sum of steering torques 308 in which the target steering torques 220 determined separately for the first operating element 104 and the second operating element 106 are involved. In one example, at least one weight in the weighted sum, in particular a weight for one of the target steering torques 220, is specified, applicable, or determined dynamically as a function of a ratio of the actual steering torques 212, 214.

In one example, for each of the two operating elements 104, 106, a compensation torque is calculated for compensating negative properties of their mechanics, e.g., friction, inertia. In one example, the two compensation torques are weighted and involved in the sum of steering torques 308.

The adjustment device 108 is configured so as to determine a transformation of the sum of steering torques 308.

In one example, the second computing device 20 is configured so as to determine the transformation of the sum of steering torques 308. In one example, the transformation comprises a multiplication 310 of the sum of steering torques 308 by a factor 312. It can be provided that the factor 312 can be modified as a function of internal or external state variables. An example of a state variable is an actual steering angle speed or a vehicle speed.

Instead of the multiplication 310, a mapping of the sum of steering torques 308 with a characteristic curve or with a function can also be provided.

The adjustment device 108, in the example of the second computing device 20, is configured so as to determine a target steering angle change 314 as a function of the transformation.

The adjustment device 108 is configured so as to determine the target steering angle 226 in iterations. In the example, the adjustment device is configured so as to determine the target steering angle 226 as a function of a sum 316 of the target steering angle changes 314 of various iterations. In the example, the second computing device 20 is configured so as to determine the sum 316.

The sum 316 comprises a first summand that is dependent on the target steering angle change 314. The sum 316 comprises a second summand that is dependent on a target steering angle 226' from an iteration preceding this iteration.

The adjustment device 108 is optionally configured so as to filter the target steering angle change 314 with a filter 318. In the example, the second computing device 20 comprises the filter 318.

In the example, the second computing device 106 comprises a memory 320, which is configured so as to store the target steering angle 226 from the previous iteration.

Optionally, the adjustment device 108 is instead configured so as to determine a filtered target steering angle change with the filter 318 and to integrate the filtered target steering angle change to the target steering angle 226.

In this example, the adjustment device 108 is configured so as to determine the target wheel steering angle 202 as a function of the target steering angle 226.

Alternatively, the adjustment device 108 is configured so as to determine the target steering angle 226 as a function of an in particular weighted sum of steering angles. The sum of steering angles comprises a first summand that is dependent on the first actual steering angle 216. The sum of steering angles comprises a second summand that is dependent on the second actual steering angle 218.

Figure 4:
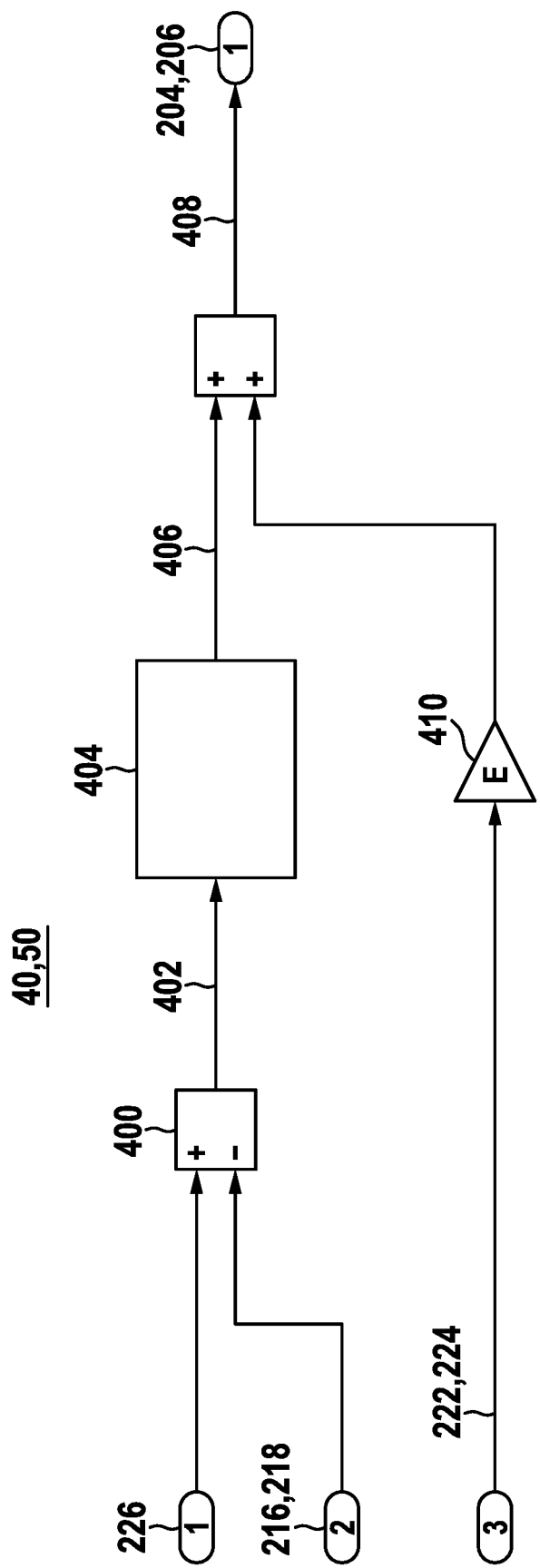

FIG. 4 shows an exemplary embodiment of the third computing device 40 and the fourth computing device 50, respectively. The construction of these will be described below using the example of the third computing device 40.

The third computing device 40 is configured so as to determine an adjustment deviation 402 of an adjustment device 404 as a function of a difference 400 of the first actual steering angle 216 from the target steering angle 226.

The adjustment device 404 is configured so as to adjust the first actual steering angle 216 to the target steering angle 226. The adjustment device 404 is configured so as to determine an output variable 406 of the adjustment device 404.

Advantageously, a behavior of the adjustment device 404 is influenced as a function of a ratio of the actual steering angles 216, 218. "Influenced" means, for example, that the first adjustment parameters or second adjustment parameters different from the first adjustment parameters are used as a function of whether the actual steering torque has a proportion of the sum that exceeds a threshold value or not.

In the example, the third computing device 40 is configured so as to determine a target steering torque 204 for the first operating element 104 as a function of an adjustment variable 408.

The adjustment variable 408 is dependent on the output variable 406 of the adjustment device 404. The adjustment variable 408 is dependent on the first pre-activation 222. In the example, the pre-activation 222 is weighted at an in particular specified or applicable weight 410. In the example, the adjustment variable 408 is the sum of the pre-activation 222 weighted at the weight 410 and the output variable 406.

In one example, the two compensation torques are weighted and involved in the sum of the pre-activation 222 weighted at the weight 410 and the output variable 406. In one example, at least one weight in the weighted sum, in particular a weight for one of the compensation torques, is specified, applicable, or determined dynamically as a function of a ratio of the actual steering torques 212, 214.

The construction of the fourth computing device 50 is corresponding, wherein, instead of the first actual steering angle 216, the second actual steering angle 218, and instead of the first pre-activation 222, the second pre-activation 224 is used in order to determine the target steering torque 206 for the second operating element 106.

The adjustment device 108 is configured so as to activate the first operating element 104 as a function of the target steering torque 204 for the first operating element 104.

The adjustment device 108 is configured so as to activate the second operating element 106 as a function of the target steering torque 206 for the second operating element 106.

The adjustment device 108 is configured so as to adjust the wheel steering angle of the vehicle 100, in particular with the actuator 112, as a function of the target wheel steering angle 202.

The adjustment device 108 is configured such that the synchronization has no negative influence on the operating feeling of the individual operating elements 104, 106 as far as possible.

A distinction is made between different situations:

Only one of the operating elements 104, 106 is used. In this case, the adjustment device 108 is configured so as to track the non-used operating element as well as possible, wherein there is no noticeable influence on the operating feeling of the operating element used.

Both operating elements 104, 106 are used synchronously. In this case, the adjustment device 108 is configured so as to not or only slightly carry out the synchronization, wherein effects on the operating feeling are avoided as much as possible for both operating elements.

Both operating elements 104, 106 are used opposite one another. The adjustment device 108 is configured so as to carry out the synchronization, wherein the synchronization torque has a noticeable influence on the operating feeling. The operating feeling is secondary, because the synchronization must occur mandatorily.

The adjustment device 108 is configured so as to detect the situations and their dynamic transition into one another and to carry out the synchronization.

Figure 5:
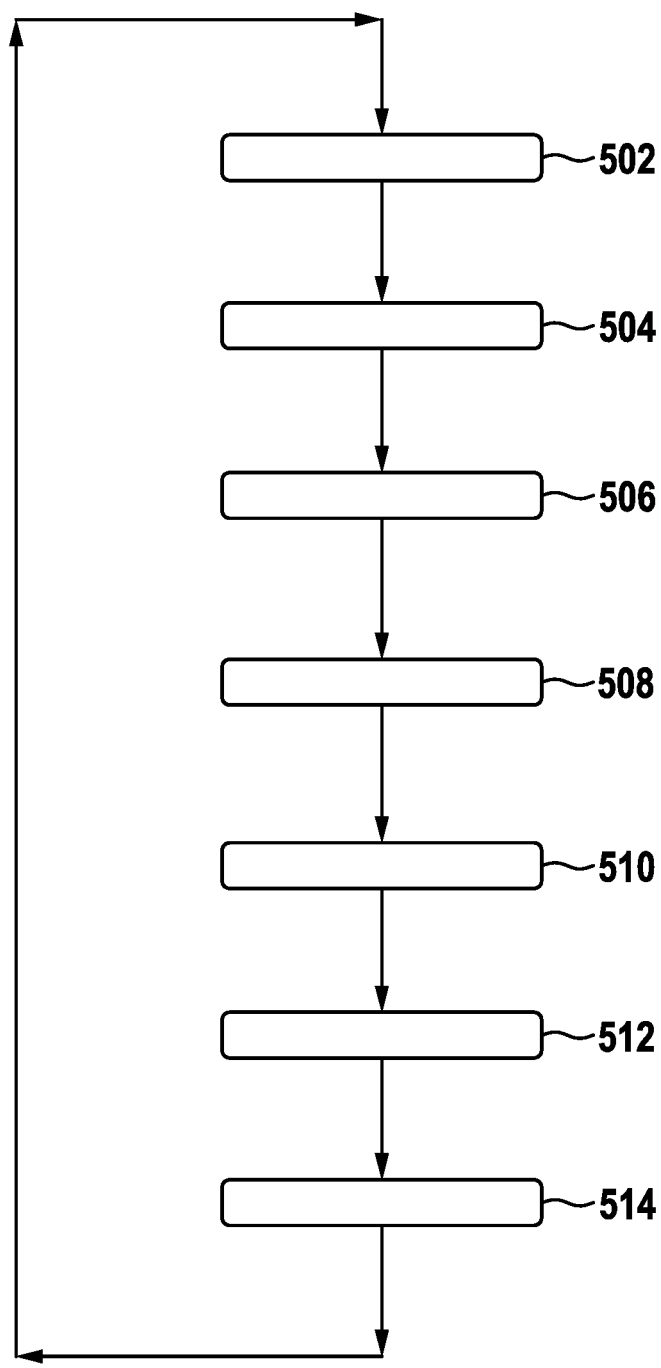

The adjustment device 108 is configured so as to carry out the method described below with reference to FIG. 5.

In a step 502, the target steering angle 226 is determined as a function of the sum of steering torques 308.

The sum of steering torques 308 comprises the first summand dependent on the target steering torque 220, the second summand dependent upon the actual steering torque 212 of the first operating element 104, and the third summand dependent upon the actual steering torque 214 of the second operating element 106.

For example, the sum of steering torques 308 is determined as a function of the first weight 302 at which the first summand of the sum of steering torques 308 is weighted.

For example, the sum of steering torques 308 is determined as a function of a second weight 304 at which the second summand of the sum of steering torques is weighted.

For example, the sum of steering torques 308 is determined as a function of the third weight 306 at which the third summand of the sum of steering torques is weighted.

In one example, the actual steering torque 212 of the first operating element 104 is measured or estimated.

In one example, the actual steering torque 214 of the second operating element 214 is measured or estimated.

Subsequently, a step 504 is carried out.

In step 504, as a function of the target steering angle 226, the first actual steering angle 216 is adjusted in the first operating element 104 and the second actual steering angle 218 is adjusted in the second operating element 106.

Subsequently, a step 506 is carried out.

In step 506, the target wheel steering angle 202 is determined as a function of the target steering angle 226 or as a function of the in particular weighted sum of steering angles.

The sum of steering angles comprises the first summand which is dependent on the first actual steering angle 216 and the second summand which is dependent on the second actual steering angle 218. The sum of steering angles can comprise a third summand comprising the in particular weighted target steering angle 226.

That is to say, the target wheel steering angle 202 is determined in one example as a function of the target steering angle 226. The target wheel steering angle 202 is determined in one example as a function of the sum of steering angles. The target wheel steering angle 202 is determined in one example as a function of the weighted sum of steering angles. The target wheel steering angle 202 can also have a constant weighting, for example 50% each of the actual steering angles 216, 218.

In the weighted sum of steering angles, a first weighting of the first actual steering angle 216 is determined, for example, as a function of the actual steering torque 212 of the first operating element 104.

In one example, a first reference sum is determined, which comprises a first summand which is dependent on an amount of the actual steering torque 212 of the first operating element 104 and comprises a second summand which is dependent on the amount of the actual steering torque 214 of the second operating element 106.

For example, the first weighting is determined as a function of a ratio of the amount of the actual steering torque 212 of the first operating element 104 to the first reference sum.

In the weighted sum of steering angles, a second weighting of the second actual steering angle 218 is determined, for example, as a function of the actual steering torque 214 of the second operating element 106.

In one example, a second reference sum is determined, which comprises a first summand which is dependent on an amount of the actual steering torque 212 of the first operating element 104 and comprises a second summand which is dependent on the amount of the actual steering torque 214 of the second operating element 106.

For example, the second weighting is determined as a function of a ratio of the amount of actual steering torque 214 of the second operating element 106 to the second reference sum.

Subsequently, a step 508 is carried out.

In step 508, as a function of the difference 400 of the first actual steering angle 216 from the target steering angle 226, the adjustment deviation 402 of the adjustment device 404 is determined, which is configured so as to adjust the first actual steering angle 216 to the target steering angle 226.

In step 508, as a function of the difference 400 of the second actual steering angle 218 from the target steering angle 226, the adjustment deviation 402 of the adjustment device 404 is determined, which is configured so as to adjust the second actual steering angle 218 to the target steering angle 226.

Subsequently, a step 510 is carried out.

In step 510, as a function of the adjustment variable 408 for the first operating element, the target steering torque 204 for the first operating element 104 is determined.

In step 510, as a function of the adjustment variable 408 for the second operating element, the target steering torque 206 for the second operating element 104 is determined.

Subsequently, a step 512 is carried out.

In step 512, the first operating element 104 is activated for the first operating element 104 as a function of the target steering torque 204.

In step 512, the second operating element 104 is activated as a function of the target steering torque 206 for the second operating element 104.

Subsequently, a step 514 is carried out.

In step 514, the wheel steering angle is adjusted as a function of the target wheel steering angle 202.

The method is carried out in the example in iterations. After step 514, step 502 is carried out.

In one iteration of the method, the target steering angle change 314 is determined as a function of the transformation of the sum of steering torques 308.

For example, the target steering angle 226 is determined as a function of the sum 316 comprising the first summand which is dependent on the target steering angle change 314 and comprising the second summand which is dependent on a target steering angle 226' from the iteration preceding this iteration.

In another example, the target steering angle change 314 is determined in multiple iterations as a function of the transformation of a respective sum of steering torques 308. For example, the target steering angle change 314 is filtered with the filter 318 in one or more of these iterations, and the filtered target steering angle change is integrated across a plurality of these iterations to the target steering angle 226.

The transformation is, for example, the multiplication 310 of the sum of steering torques 308 by a factor of 312 or mapping the sum of steering torques 308 with the curve or function.

The method and system 102 are used in one example for coupling more than two operating elements. In this case, a further operating element target is integrated, as indicated for the two operating elements described in the example. The respective target steering torque is determined as a function of the further actual steering torque and as a function of the further actual steering angle. These are involved in the corresponding sums.

The method and system 102 are used in one example for adjusting only one operating element without coupling.

For example, the method and system 102 is used in order to couple one or more operating elements to the actuator 112 of the steering. An inclusion of a tie rod force of the steering can be provided for this purpose. For example, the tie rod force is measured, calculated, or estimated. The inclusion of the tie rod force is carried out, for example, by adding it into the summation for calculating the target steering angle change.

The method and system 102 are used, for example, for coupling different operating elements, e.g., a steering wheel with alternative control, in particular a joystick. The first operating element 104 in this example is the steering wheel, and the second operating element 106 is the joystick.

For example, the method and system 102 are used for a vehicle longitudinal guidance that provides the driving state variables 208 and other input variables 210.

The method and system 102 can also be used in a non-steering or non-vehicle application area that evaluates or specifies the described variables, for example.

The invention claimed is:

1. A method for guiding a vehicle having a system that includes a first operating element and a second operating element for influencing a wheel steering angle of the vehicle, wherein the first operating element and the second operating element are not mechanically coupled to one another, the method comprising:
   determining a target steering angle as a function of a sum of steering torques, the sum of steering torques including a first summand dependent on a target steering torque, a second summand dependent on an actual steering torque of the first operating element, and a third summand dependent on an actual steering torque of the second operating element,
   adjusting a first actual steering angle of the first operating element as a function of the target steering angle;
   adjusting a second actual steering angle of the second operating element as a function of the target steering angle;
   determining a target wheel steering angle as a function of the target steering angle or as a function of a weighted sum of steering angles, the weighted sum of steering angles including a fourth summand dependent on the first actual steering angle and a fifth summand dependent on the second actual steering angle; and
   adjusting the wheel steering angle as a function of the target wheel steering angle.

2. The method according to claim 1, wherein:
   the determining of the target wheel steering angle includes determining the target wheel steering angle as the function of the weighted sum of steering angles, which comprises:
      determining a first weighting of the first actual steering angle as a function of the actual steering torque of the first operating element; and/or
      determining a second weighting of the second actual steering angle as a function of the actual steering torque of the second operating element.

3. The method according to claim 2, wherein:
   the first weighting is determined as a function of a relation of an amount of the actual steering torque of the first operating element to a first reference sum, which comprises a fifth summand dependent on an amount of the actual steering torque of the first operating element and a sixth summand dependent on the amount of actual steering torque of the second operating element; and/or
   the second weighting is determined as a function of a relation of an amount of the actual steering torque of the second operating element to a second reference sum, which comprises a seventh summand dependent on an amount of the actual steering torque of the first operating element and a second summand dependent on the amount of actual steering torque of the second operating element.

4. The method according to claim 3, wherein the weighted sum of steering angles comprises an eighth summand comprising the target steering angle.

5. The method according to claim 1, further comprising:
(i) determining a first adjustment deviation of a first adjustment device, which is configured to adjust the first actual steering angle to the target steering angle, as a function of a first difference of the first actual steering angle from the target steering angle, (ii) determining a first target steering torque for the first operating element as a function of a first adjustment variable, which is determined as a function of a first output variable of the first adjustment device and a first pre-activation, which is weighted with a first weight, for the first operating element, and (iii) activating the first operating element as a function of the target steering torque for the first operating element; and/or
(i) determining a second adjustment deviation of a second adjustment device, which is configured to adjust the second actual steering angle to the target steering angle, as a function of a second difference of the second actual steering angle from the target steering angle, (ii) determining a second target steering torque for the second operating element as a function of a second adjustment variable, which is determined as a function of a second output variable of the second adjustment device and as a function of a second pre-activation, which is weighted with a second weight, for the second operating element, and (iii) activating the second operating element as a function of the target steering torque for the second operating element.

6. The method according to claim 1, further comprising:
measuring or estimating the actual steering torque of the first operating element; and/or
measuring or estimating the actual steering torque of the second operating element.

7. The method according to claim 1, wherein the sum of steering torques is dependent on a first weight at which the first summand of the sum of steering torques is weighted, a second weight at which the second summand of the sum of steering torques is weighted, and/or a third weight at which the third summand of the sum of steering torques is weighted.

8. The method according to claim 1, wherein, an iteration of the method further comprises:
determining a target steering angle change as a function of a transformation of the sum of steering torques,
wherein the target steering angle is determined as a function of a sum, which comprises a ninth summand dependent on the target steering angle change, and a tenth summand dependent on the target steering angle from a prior iteration.

9. The method according to claim 1, further comprising:
determining a target steering angle change as a function of a transformation of the sum of steering torques,
wherein the target steering angle change is filtered with a filter, and
wherein the filtered target steering angle change is integrated into the target steering angle.

10. The method according to claim 1, wherein:
the target steering torque is determined with a first computing device separately for the first operating element and the second operating element; and/or
a respective compensation torque is calculated for compensating negative properties of mechanics for the first operating element and the second operating element.

11. The method according to claim 10, wherein:
the sum of steering torques is a weighted sum of steering torques; and
the weighted sum of steering torques is determined with a second computing device using calculation of the target steering torques and/or compensation torques determined separately for the first operating element and the second operating element.

12. The method according to claim 11, wherein at least one weight in the weighted sum of steering torques is specified, is applicable, or is determined dynamically as a function of a ratio of the actual steering torques of the first and second operating elements.

13. The method according to claim 8, wherein the transformation of the sum of steering torques includes multiplying the sum of steering torques by a factor or mapping of the sum of steering torques with a characteristic curve or with a function.

14. The method according to claim 9, wherein the transformation of the sum of steering torques includes multiplying the sum of steering torques by a factor or mapping of the sum of steering torques with a characteristic curve or with a function.

15. A system for guiding a vehicle, the system comprising:
a first operating element configured to influence a wheel steering angle of the vehicle;
a second operating element configured to influence the wheel steering angle of the vehicle, wherein the first operating element and the second operating element are not mechanically coupled to one another;
an adjustment device configured to:
determine a target steering angle as a function of a sum of steering torques, the sum of steering torques including a first summand dependent on a target steering torque, a second summand dependent on an actual steering torque of the first operating element, and a third summand dependent on an actual steering torque of the second operating element,
adjust a first actual steering angle of the first operating element as a function of the target steering angle;
adjust a second actual steering angle of the second operating element as a function of the target steering angle;
determine a target wheel steering angle as a function of the target steering angle or as a function of a weighted sum of steering angles, the weighted sum of steering angles including a fourth summand dependent on the first actual steering angle and a fifth summand dependent on the second actual steering angle; and
adjust the wheel steering angle as a function of the target wheel steering angle.

16. The system according to claim 15, wherein the adjustment device is further configured to determine of the target wheel steering angle by determining the target wheel steering angle as the function of the weighted sum of steering angles, which comprises:
determining a first weighting of the first actual steering angle as a function of the actual steering torque of the first operating element; and/or determining a second weighting of the second actual steering angle as a function of the actual steering torque of the second operating element.

17. A vehicle comprising:
the system for guiding the vehicle according to claim 15.

* * * * *